Dec. 12, 1961  L. R. KRIVIT  3,012,463
EXAMINING DEVICE
Filed Aug. 17, 1959  2 Sheets-Sheet 1

INVENTOR.
LAWRENCE R. KRIVIT
BY Richards Geier
ATTORNEYS

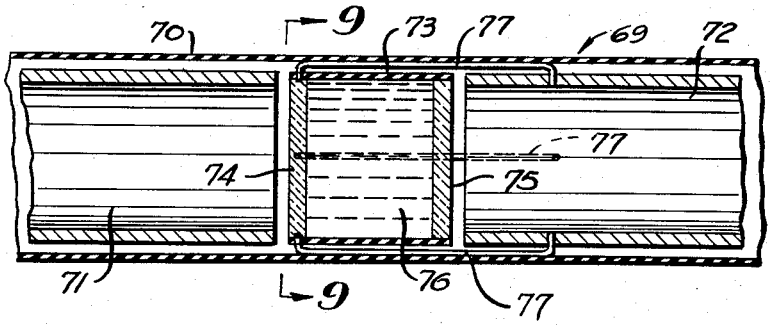
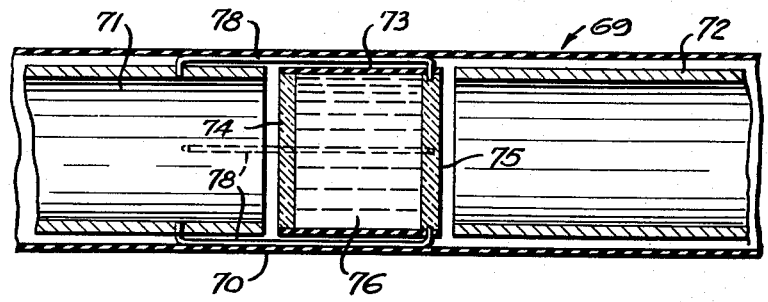
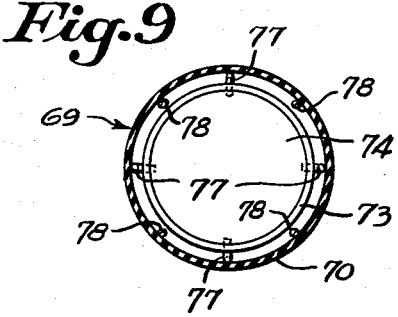
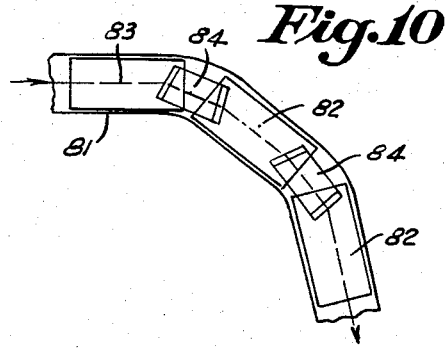

United States Patent Office 3,012,463
Patented Dec. 12, 1961

3,012,463
EXAMINING DEVICE
Lawrence R. Krivit, 47 Parker Ave., Deal, N.J.
Filed Aug. 17, 1959, Ser. No. 834,047
12 Claims. (Cl. 88—1)

This invention relates to an examining device, and refers, more particularly to a device for examining the interior of bent and curved tubes and cavities, and is particularly useful for exploratory examination of the interior of human cavities.

Some examining instruments of prior art are flexible so as to be insertable in curved or bent tubes but have the disadvantage that they must be straightened out in order to perform a visual examination of the interior of the tube or cavity. Other prior art devices require reflecting elements which are substantially in end-to-end contact, which increases the weight of the instrument. Still other prior art devices have continuous outer portions which also add additional weight to the instrument, and this additional weight causes the instrument to be cumbersome in usage. A further type of examining instrument has a large number of light absorbing elements which decreases the usefulness of the examining instrument. Another disadvantage of the prior art instruments is that their flexibility is not easily controlled and that they often distort or injure the tube in which they are inserted.

An object of the present invention is to provide an examining device which eliminates the disadvantages of prior art.

Another object is the provision of a flexible examining device allowing clear visualization without distortion in tubes and cavities having complex turns or bends.

Another object is to provide a device allowing visual examination around relatively sharp corners.

Still another object is to provide an examining device which is insertable and movable within tubes having complex bends and turns without distorting or disturbing the tube.

Still another object is to provide a light weight examining device which is easily controllable.

A further object is to provide an examining device which is inexpensive and easy to manufacture.

Other objects of the present invention will become apparent in the course of the following specification.

The objects of the present invention may be realized through the provision of an examining device comprising an outer tubular casing containing a series of substantially longitudinally aligned outer portions which are rotatably connected in succession and a series of light-transmitting or reflecting devices which are capable of making themselves compatible with the rotation or turning of the outer portion. The examining device is such that regardless of the bends or turns to which the outer portion is subjected while being inserted in a complex-curved tube, the light-transmitting device will gather light at one end of the outer portion and sucessively transmit the light through the bent or curved outer portion to the other end of the outer portion. Thus, it can be seen that the entire cavity can be examined while the examining device is being inserted therein.

The invention will appear more clearly from the following detailed description when taken in connection with the accompanying drawings showning, by way of example, preferred embodiments of the inventive idea.

In the drawings:

FIGURE 7 is a longitudinal sectional view of a portion of another examining device of the present invention;

FIGURE 8 is a different sectional view of the device of FIGURE 7;

FIGURE 9 is a transverse section along the line 9—9 of FIGURE 7;

FIGURE 10 is a schematic view showing a series of sections of the present invention transmitting a light ray;

FIGURE 11 shows a series of sections of the present invention provided with pivots for three dimensional rotation.

Figure 1:
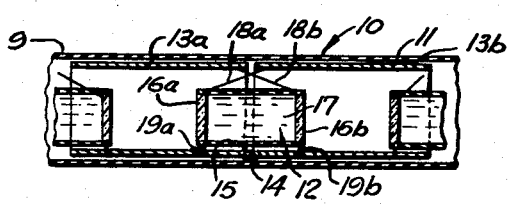
FIGURE 1 is a longitudinal sectional view through two adjacent sections in a series of sections of an examining device of the present invention with the sections in longitudinal alignment.

A portion of the examining device 10 of the present invention is shown in FIGURE 1 and comprises an outer portion 11 and an inner portion 12. The portion 11 is enclosed in a flexible casing 9. The outer portion 11 comprises short, but relatively elongated, rigid, cylindrical outer sections two of which, namely, sections 13a, 13b, are illustrated in the drawing. The sections are rotatably connected by a hinge 14. The inner portion 12 comprises a plurality of flexible tubes which act as adjustable fluid prisms, and which includes a flexible tube 15 having glass plates 16a, 16b (or other light-transmitting members) disposed at each end, and a light-transmitting liquid 17, such as water, within the flexible tube 15. The flexible tube 15 is disposed partially in each of the cylindrical outer sections 13a, 13b, and the glass plates 16a, 16b are each rotatably connected at points 19a, 19b by suitable pivots to the corresponding outer sections 13a, 13b. A connecting member, such as connecting wire 18a, connects the top of glass plate 16a with one end of the outer section 13b and a corresponding wire 18b connects the top of glass plate 16b with one end of the outer section 13a.

FIGURE 1 merely shows the connection between two adjacent outer sections 13a and 13b, but any suitable number of such sections may be connected in like manner.

Figure 2:
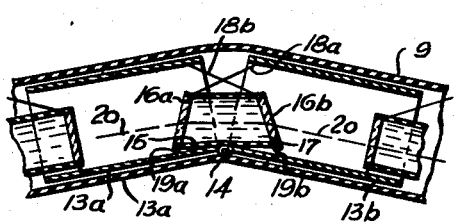
FIGURE 2 is a longitudinal sectional view with the two adjacent sections at an angle to one another.

The manner of use and operation of the examining device 10 are as follows:

As the device 10 is inserted in a tube having complex turns the adjacent outer sections 13a and 13b will rotate relatively to one another about the hinge or pivot 14, so that each short section and its adjacent sections will assume the configuration of the tube or cavity in which it is inserted. The device 10 will not cause distortion of the tube or cavity since the slightest pressure of the cavity walls will cause rotation of the outer sections 13a, 13b. As is shown in FIGURE 2, when the outer sections 13a, 13b rotate relative to one another, the flexible tube 15 bends to conform to the configuration of the outer sections 13a, 13b. Since the glass plates 16a, 16b are rotatably connected to the outer sections 13a, 13b, respectively, they rotate due to the fact that the connecting wires 18a, 18b are connected to the adjacent outer sections. Thus, looking in the direction of FIGURE 2, the plate 16a is rotated about point 19a toward the right due to the action of wire 18a, while plate 16b is rotated about point 19b to the left due to the action of wire 18b. Thus, the two glass plates 16a, 16b and the flexible tube 15, form a light-transmitting device. For example, in FIGURE 2, a light-ray 20 coming from the left through section 13a will be transmitted through the glass plate 16a, through liquid 17 in flexible tube 15, and thence through glass plate 16b, and then is transmitted to the right through the tube section 13b. It will be noted that the light-ray 20 thus substantially follows the configuration of the outer tube sections 13a and 13b and can successively be transmitted from one end of a bent or curved outer portion 11 to the other end of said outer portion 11 without impairing the visual examination.

Figure 3:
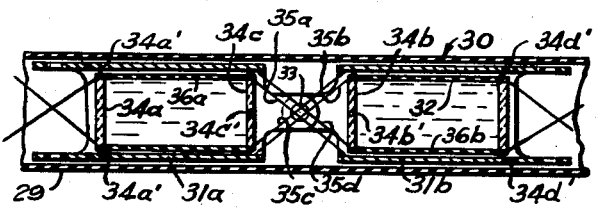
FIGURE 3 is a longitudinal sectional view through adjacent sections of another embodiment of the present invention.

Another embodiment 30 of the present invention is shown in FIGURE 3 and comprises an outer flexible casing 29 containing adjacent outer sections 31a, 31b and an inner portion 32. The outer sections 31a, 31b are rotatably connected by a pivot 33; they are connected to adjacent outer sections by pivots extending at right angles to the pivot 33. The inner portion 32 comprises flexible tubes 36a, 36b, and glass plates 34a, 34b, 34c, and 34d, rotatably connected by suitable pivots at points 34a', 34b', 34c' and 34d', respectively, to the outer sections in which they are respectively disposed. Wires 35a and 35c connect the glass plate 34c to the adjacent outer section 31b, and wires 35b and 35d connect the glass plate 34b to the adjacent outer section 31a.

Figure 4:
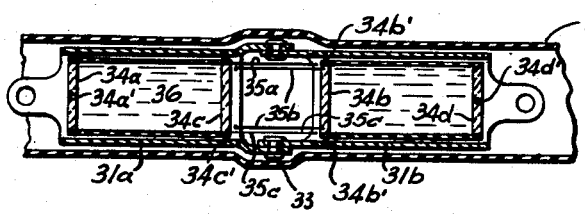
FIGURE 4 is a plan sectional view of the embodiment of FIGURE 3.

As can be seen from FIGURES 3 and 4 the outer portions 31a and 31b are not fully continuous, and, therefore, a reduction in weight is achieved. Such a reduction in weight may be very important in examining devices.

As can be seen from FIGURE 4, there are actually two complete sets of wires 35a, 35b, 35c, 35d on opposite sides of the device 30.

Figure 5:
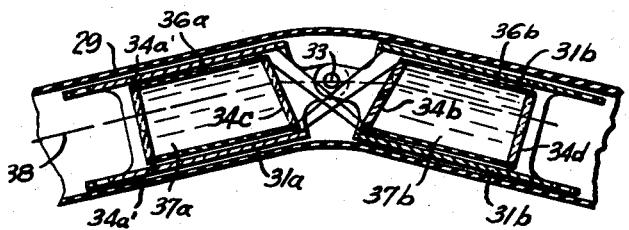
FIGURE 5 is a longitudinal sectional view of the embodiment of FIGURE 3 with the adjacent sections at an angle to one another.

The manner of operation of the device 30 is as follows:
As the device 30 is inserted in a tube having many turns the adjacent sections 31a, 31b change their relative configuration (so as to easily conform to the curvature of the tube or cavity) by rotation about hinge 33. As is seen in FIGURE 5, when the outer portions 31a, 31b rotate about hinge 33, the wires 35a, 35b, 35c, 35d cause the glass plates 34c and 34b to rotate about their respective pivot points 34c', 34b', and the flexible tubes 36a, 36b also change their configuration so as to form light-transmitting devices comprising plates 34a, 34c and flexible tube 36a, and plates 34b, 34d and tube 36b. A light-ray 38 entering the outer section 31a from the left (FIG. 5) passes through plate 34a, liquid 37a within flexible tube 36a, and glass plate 34c, from whence it goes to plate 34b and passes through liquid 37b, and thence is transmitted through the plate 34d. Thus, a light ray is made to substantially follow the curvature of the outer sections 31a, 31b of the device 30.

Figure 6:
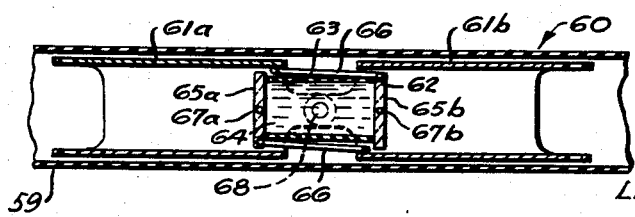
FIGURE 6 is a longitudinal sectional view of adjacent sections of still another embodiment of the present invention.

Another embodiment 60 of the present invention is shown in FIGURE 6 and comprises an outer flexible casing 59 containing outer tube sections 61a, 61b, and an inner portion 62 comprising a flexible tube 63 containing transparent liquid 64 and having transparent glass plates 65a, 65b at either end. Rigid rods 66 connect the upper portion of plate 65b to one end of the outer section 61a and connect the lower portion of plate 65a to one end of outer section 61b. The rigid rods are pivotally connected to the glass plates and outer sections. The glass plates, in turn, are pivotally connected to the outer sections 61a, 61b by suitable pivots at points 67a, 67b.

The manner of operation of device 60 is similar to the operation of device 10 with the exception that rods 66 are used to control the rotation of plates 65a 65b. Also, since the glass plates 65a, 65b are connected to the outer sections on a diametrical axis, and since the outer sections 61a, 61b are centrally pivoted at point 68, both up and down rotation may be achieved.

It can be readily calculated that if the refractive index of the liquid 64 is 1.5, the rods 66 should be so dimensioned that if, by way of example, the outer tube sections 61a, 61b are bent to the extent of 30°, each of the glass plates 65a, 65b will be bent to the extent of 45°.

The examining device 69 shown in FIGURES 7, 8 and 9, includes an outer flexible casing 70 containing a number of rigid tubular sections 71, 72. A separate flexible tube 73 is located between two adjacent tubular sections 71, 72. The tube 73 is firmly connected on opposite sides with glass plates or lenses 74 and 75 and contains a light-transmitting liquid 76.

In the example illustrated, there are four preferably rigid wires 77 which have adjacent ends firmly attached to the rigid tubular section 72, while their opposite ends are embedded in the glass plate 74. Four other preferably rigid wires 78 connect the rigid tubular section 71 with the glass plate 75. As shown in FIGURE 9, the wires 77 are circumferentially spaced by an angle of 90°, while the wires 78 are located between the wires 77 and are similarly spaced relatively to each other.

Obviously, the number of wires 77 and 78 may be varied, if desired.

It is apparent that in operation, when the two rigid tubular sections 71 and 72 are bent relatively to each other, the glass plate 75 will assume the same angle as the section 71, while the glass plate 74 will follow the position of the section 72, thereby facilitating the transmission of light.

FIGURE 10 illustrates diagrammatically an examining device 81 of the present invention which contains a series of sections 82 passing a ray of light 83 along a curved path by means of glass elements 84.

FIGURE 11 shows that an examining device 85 of the present invention is so constructed that its outer sections 86 can move in three dimensions due to the provision of pivots 87. Thus, once the examining device is inserted into a tube or cavity, it will follow the curvature of the tube regardless of the complexity of the tube and will not distort the tube, since the pivots allow movement of the successive sections after a slight contact with a wall of the tube.

It is apparent that an examining device of the present invention can be conveniently combined with other devices known in the art, such as a source of illumination, an air tube for pumping the stomach, a wash tube for drawing up cells, a biopsy forceps for the taking of samples, and many others.

Furthermore, due to the rigidity of the outer sectional tubes, remote control of the examining device of the present invention can be readily effected, for example, by means of suitable hydraulic devices.

Among the advantages of the examining device of the present invention are the following:

The device is flexible; the device is insertable and movable within tubes having complex turns without distorting or disturbing the tube or cavity; the device allows visual examination around relatively sharp corners; the device is light weight and is easily controllable; and the device is inexpensive and easy to manufacture.

It is apparent that the described examples are capable of many variations and modifications within the scope of the present invention. All such variations and modifications are to be included within the scope of the present invention.

What is claimed is:

1. An examining device, comprising an outer flexible casing, a plurality of hollow rigid sections located within said casing and having opposed ends, a plurality of flexible sections, at least one of said flexible sections being located close to one of said opposed ends, each of said flexible sections comprising a flexible tube, two light-transmitting plates connected to opposite ends of said tube, and a light-transmitting fluid within said tube, one of said plates being located close to an end of one rigid section, and the other one of said plates being located close to an opposed end of an adjacent rigid section, said plates being adapted to receive light passing through the rigid sections, means firmly connecting said one plate with said adjacent rigid section, and means firmly connecting said other plate with said one rigid section whereby a change in configuration of said rigid sections causes a change in configuration of said flexible sections and said flexible sections act as adjustable fluid prisms transmitting light to follow the configuration of said rigid sections by refraction.

2. An examining device in accordance with claim 1, comprising means pivotally supporting said one plate within said one rigid section and means pivotally supporting said other plate within said adjacent rigid section.

3. An examining device in accordance with claim 1, comprising means pivotally interconnecting opposed ends of two rigid sections.

4. An examining device in accordance with claim 3, wherein the pivotal axes at two ends of a rigid section extend at right angles to each other.

5. An examining device, comprising a series of adjacent cylindrical outer sections; a series of adjustable liquid containing light-transmitting portions disposed within said outer sections, a light-transmitting member connected to each end of said light-transmitting portion, means rotatably connecting each of said light-transmitting members to that section within which it is disposed, and means connecting each of said light-transmitting members to an adjacent outer section, whereby a change in configuration of said outer sections causes a change in configuration of said light-transmitting portions and said light-transmitting portions act as adjustable fluid prisms transmitting light to follow the configuration of said outer sections by refraction.

6. An examining device, comprising an outer portion, said outer portion comprising a series of adjacent, relatively elongated, rigid cylindrical outer sections, means rotatably and longitudinally connecting successively together said outer sections; a series of adjustable liquid containing light-transmitting members disposed within said outer sections, means rotatably connecting each of said light-transmitting members to that section within which it is disposed, and means connecting each of said light-transmitting members to the adjacent outer section for orienting said light-transmitting members with respect to said outer portion, so that light is transmitted within said outer portion following the configuration of said outer portion.

7. An examining device, comprising an outer portion, said outer portion comprising a series of adjacent, relatively elongated, rigid, cylindrical outer sections each having two end regions, means rotatably and longitudinally connecting successively together said adjacent outer sections; and an inner light-transmitting portion comprising a plurality of elongated flexible tubes, each of said flexible tubes being partly disposed in one end region of each of two successive adjacent outer sections, a light-transmitting member securely connected in air-tight fashion to each end of said flexible tubes, a transparent liquid disposed in each of said flexible tubes, means rotatably connecting each of said light-transmitting members to the outer section in which it is disposed, a plurality of elongated connecting members, each connected at one end to one of said light-transmitting members at a point remote from the aforesaid connection of said light-transmitting member to said outer portion, the other end of said elongated connecting member being connected to the outer section adjacent to the end region in which said light-transmitting member is disposed, whereby when said adjacent outer sections are rotated with respect to one another the movement of the adjacent outer sections causes said connecting member to rotate said light-transmitting member toward the said immediately adjacent outer section, whereby said inner light-transmitting portion acts as adjustable fluid prisms changing in configuration as said outer portion changes in configuration and light is transmitted within said outer portion from outer section to outer section by refraction.

8. An examining device in accordance with claim 7, wherein said adjacent successive outer sections are rotatably connected at two diametrically opposite points, said light-transmitting members being rotatably connected to said outer sections at two diametrically opposite points, and said connecting members being rigid.

9. An examining device in accordance with claim 7, wherein successive connections between successive outer sections are 90° apart, whereby the series of outer sections can be bent in three dimensions.

10. An examining device, comprising an outer portion, said outer portion comprising a series of spaced, relatively elongated, rigid, cylindrical outer sections each having two end regions and small protruding end portions extending longitudinally therefrom, said successive outer sections rotatably connected at said protruding end portions; and an inner light-transmitting portion comprising a plurality of elongated flexible tubes each entirely disposed within one of said outer sections and extending into both end regions of said outer section, a light-transmitting member securely connected in air-tight fashion to each end of said flexible tubes, a transparent liquid disposed in said flexible tubes; each of said light-transmitting members rotatably connected to the outer section in which it is disposed, a plurality of elongated connecting members each connected at one end to one of said light-transmitting members and connected at the other end to an outer section adjacent to the end region in which said light-transmitting member is disposed, whereby when said adjacent outer sections are rotated with respect to one another the movement of the adjacent sections causes said connecting member to rotate said light-transmitting member toward the said immediately adjacent section, whereby said inner light-transmitting portion acts as adjustable fluid prisms changing in configuration as said outer portion changes in configuration and light is transmitted within said outer portion from section to section by refraction.

11. An examining device in accordance with claim 10, wherein said different light-transmitting members in each one of said tubes are rotatably connected to said outer section at points 90° apart from each other.

12. An examining device, comprising an outer flexible casing, a plurality of hollow rigid sections located within said casing and having opposed ends, a plurality of flexible sections, each flexible section being located between opposed ends of two adjacent rigid sections, each flexing section comprising a flexible tube, two light-transmitting plates connected to opposite ends of said tube, and a light-transmitting fluid within said tube, one of said plates being located close to an end of one rigid section, and the other one of said plates being located close to an opposed end of an adjacent rigid section, said plates being adapted to receive light passing through the rigid sections, wires firmly connecting said one plate with said adjacent rigid section, and other wires firmly connecting said other plate with said one rigid section, whereby the configuration of each said flexible sections changes as the configuration of said rigid sections change, whereby said flexible sections act as adjustable fluid prisms and transmit light within said rigid sections by refraction.

References Cited in the file of this patent

UNITED STATES PATENTS

| | | |
|---|---|---|
| 598,787 | Kelling | Feb. 8, 1898 |
| 757,900 | Englund | Apr. 19, 1904 |
| 944,830 | Sussmann | Dec. 28, 1909 |
| 1,550,197 | Berry | Aug. 18, 1925 |
| 1,782,906 | Newman | Nov. 25, 1930 |
| 1,915,811 | Wolf | June 27, 1933 |
| 1,999,201 | Nichols | Apr. 30, 1935 |
| 2,424,064 | Stegeman | July 15, 1947 |
| 2,504,039 | O'Leary | Apr. 11, 1950 |

FOREIGN PATENTS

| | | |
|---|---|---|
| 87,254 | Norway | Apr. 16, 1956 |
| 200,842 | Germany | Apr. 28, 1906 |
| 367,462 | France | Sept. 3, 1906 |